US009459879B2

(12) United States Patent
Gupta et al.

(10) Patent No.: US 9,459,879 B2
(45) Date of Patent: Oct. 4, 2016

(54) SYSTEMS AND METHODS FOR THERMAL MITIGATION WITH MULTIPLE PROCESSORS

(71) Applicant: QUALCOMM Incorporated, San Diego, CA (US)

(72) Inventors: Sudhendra Kumar Gupta, San Diego, CA (US); Reza Shahidi, San Diego, CA (US); Shyamal Ramachandran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 284 days.

(21) Appl. No.: 13/780,259

(22) Filed: Feb. 28, 2013

(65) Prior Publication Data

US 2013/0332720 A1 Dec. 12, 2013

Related U.S. Application Data

(60) Provisional application No. 61/657,502, filed on Jun. 8, 2012.

(51) Int. Cl.
*G06F 1/24* (2006.01)
*G06F 9/00* (2006.01)
(Continued)

(52) U.S. Cl.
CPC ............... *G06F 9/44* (2013.01); *G06F 9/4893* (2013.01); *G06F 1/206* (2013.01);
(Continued)

(58) Field of Classification Search
CPC ...... G06F 1/206; G06F 2217/80; G06F 1/30; G06F 1/3287; G06F 1/20; G06F 11/3058; G01K 7/425; H04L 1/0002; H04L 12/10; H04L 2012/2845; H04Q 2213/13199; H04Q 2213/13334; H04Q 2213/1308; H04M 7/0009; H04M 1/72536; H04M 1/72569; H04W 88/16; H04W 52/028; H04W 84/12; H01L 21/67248
See application file for complete search history.

(56) References Cited

U.S. PATENT DOCUMENTS 6,954,436 B1 10/2005 Yip et al.
7,778,739 B2 8/2010 Preston et al.
(Continued)

FOREIGN PATENT DOCUMENTS

EP 1182556 A2 2/2002
JP 2007214761 A 8/2007

OTHER PUBLICATIONS

Choi, et al., "Thermal-aware task scheduling at the system software level", Proceedings of the 2007 international symposium on low power electronics and design, 213-218. doi:10.1145/1283780. 1283826, See sections 2.2-2.4 & 3.1-3.2. Aug. 2007, 6pgs.
(Continued)

*Primary Examiner* — Xuxing Chen
(74) *Attorney, Agent, or Firm* — Austin Rapp & Hardman

(57) ABSTRACT

A wireless communication device for thermal mitigation with multiple processors is described. The wireless communication device includes a first communications processor that processes a data call. The wireless communication device also includes a second communications processor coupled to the first communications processor. The first communications processor performs a thermal mitigation operation by sending instructions to the second communications processor when at least one thermal threshold is reached. The second communications processor receives and executes the instructions.

50 Claims, 10 Drawing Sheets

(51) Int. Cl.
*G06F 9/44* (2006.01)
*G06F 9/48* (2006.01)
*H04M 7/00* (2006.01)
*H04W 52/02* (2009.01)
*G06F 1/20* (2006.01)
*H04L 12/28* (2006.01)
*H04W 88/16* (2009.01)
*H04L 12/10* (2006.01)

(52) U.S. Cl.
CPC .......... *G06F 2217/80* (2013.01); *H04L 12/10* (2013.01); *H04L 2012/2845* (2013.01); *H04M 7/0009* (2013.01); *H04Q 2213/13199* (2013.01); *H04Q 2213/13334* (2013.01); *H04W 52/028* (2013.01); *H04W 88/16* (2013.01); *Y02B 60/144* (2013.01)

(56) References Cited

U.S. PATENT DOCUMENTS

| | | |
|---|---|---|
| 8,244,296 B2 | 8/2012 | Dorsey et al. |
| 2006/0068837 A1* | 3/2006 | Malone ............. H04W 72/1215 455/552.1 |
| 2006/0193250 A1* | 8/2006 | Desjardins et al. .......... 370/219 |
| 2007/0074071 A1 | 3/2007 | Rothman et al. |
| 2010/0138530 A1 | 6/2010 | Brillhart et al. |
| 2010/0332799 A1* | 12/2010 | Sonobe ........................... 712/43 |
| 2011/0230163 A1* | 9/2011 | Jin et al. .................... 455/404.1 |

OTHER PUBLICATIONS

International Search Report and Written Opinion—PCT/US2013/044664—ISA/EPO—Sep. 20, 2013.

\* cited by examiner

SYSTEMS AND METHODS FOR THERMAL MITIGATION WITH MULTIPLE PROCESSORS

RELATED APPLICATIONS

This application is related to and claims priority from U.S. Provisional Patent Application Ser. No. 61/657,502, filed Jun. 8, 2012, for "THERMAL MITIGATION WITH MULTIPLE PROCESSORS", the entirety of which is incorporated herein by reference.

TECHNICAL FIELD

The present disclosure relates generally to communication systems. More specifically, the present disclosure relates to systems and methods for thermal mitigation with multiple processors.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Some electronic devices (e.g., cellular phones, smart phones, computers, etc.) communicate with other electronic devices. For example, a cellular phone may wirelessly communicate with a base station by transmitting and receiving electromagnetic signals over the air.

As processing speed and complexity in electronic devices increase, thermal emissions may pose particular challenges. For example, processors that function at higher clock rates may emit more heat. As can be observed from this discussion, systems and methods that help to control heat emissions may be beneficial.

SUMMARY

A wireless communication device for thermal mitigation with multiple processors is described. The wireless communication device includes a first communications processor that processes a data call. The wireless communication device also includes a second communications processor coupled to the first communications processor. The first communications processor performs a thermal mitigation operation by sending instructions to the second communications processor when at least one thermal threshold is reached. The second communications processor receives and executes the instructions.

The instructions may include instructions for only allowing emergency communications. The instructions may include instructions for transferring packet data communication operation to the second communications processor. The instructions may direct the second communications processor to disable streaming data traffic. The instructions may be based on the at least one thermal threshold.

The thermal mitigation operation may include reducing a processing clock speed, reducing a receive data rate, reducing a transmit data rate and/or disabling streaming data traffic. The first communications processor may provide data associated with the data call to the second communications processor when the at least one thermal threshold is reached. The first communications processor may provide session information associated with the data call to the second communications processor when the at least one thermal threshold is reached.

The wireless communication device may include at least one thermal sensor coupled to the first communications processor that obtains a thermal indication. The first communications processor may include a modem. The first communications processor may include a transmitter and/or a receiver. The second communications processor may include a modem. The second communications processor may include at least one of a group consisting of a transmitter and a receiver. The first communications processor may be capable of operating at a higher clock rate than the second communications processor.

The first communications processor may provide communication functions in accordance with Time Division Long-Term Evolution (TD-LTE), Time Division Synchronous Code Division Multiple Access (TD-SCDMA), Frequency-Division Duplexing Long-Term Evolution (FDD-LTE), Universal Mobile Telecommunication System (UMTS), Global System for Mobile Communications (GSM) Enhanced Data Rates for GSM Evolution (EDGE) Radio Access Network (GERAN) and/or Global Positioning System (GPS). The second communications processor may provide communication functions in accordance with Global System for Mobile Communications (GSM), General Packet Radio Service (GPRS), Enhanced Data Rates for GSM Evolution (EDGE) and/or one or more of second-generation (2G), third-generation (3G) and fourth-generation (4G) wireless technology of 3rd Generation Partnership Project (3GPP) specifications or 3rd Generation Partnership Project 2 (3GPP2) specifications.

A method for thermal mitigation with multiple processors is also described. The method includes processing a data call by a first communications processor. The method also includes performing a thermal mitigation operation, by the first communications processor, by sending instructions to a second communications processor when at least one thermal threshold is reached. The method further includes receiving and executing the instructions at the second communications processor.

A computer-program product for thermal mitigation with multiple processors is also described. The computer-program product includes a non-transitory tangible computer-readable medium with instructions. The instructions include code for causing a wireless communication device to process a data call. The instructions also include code for causing the wireless communication device to perform a thermal mitigation operation, by a first communications processor, by sending second instructions to a second communications processor when at least one thermal threshold is reached. The instructions further include code for causing the wireless communication device to receive and execute the instructions at the second communications processor.

An apparatus for thermal mitigation is also described. The apparatus includes a first processing means for processing a data call and for performing a thermal mitigation operation by sending instructions when at least one thermal threshold is reached. The apparatus also includes a second processing means for receiving and executing the instructions.

DETAILED DESCRIPTION

Figure 1:
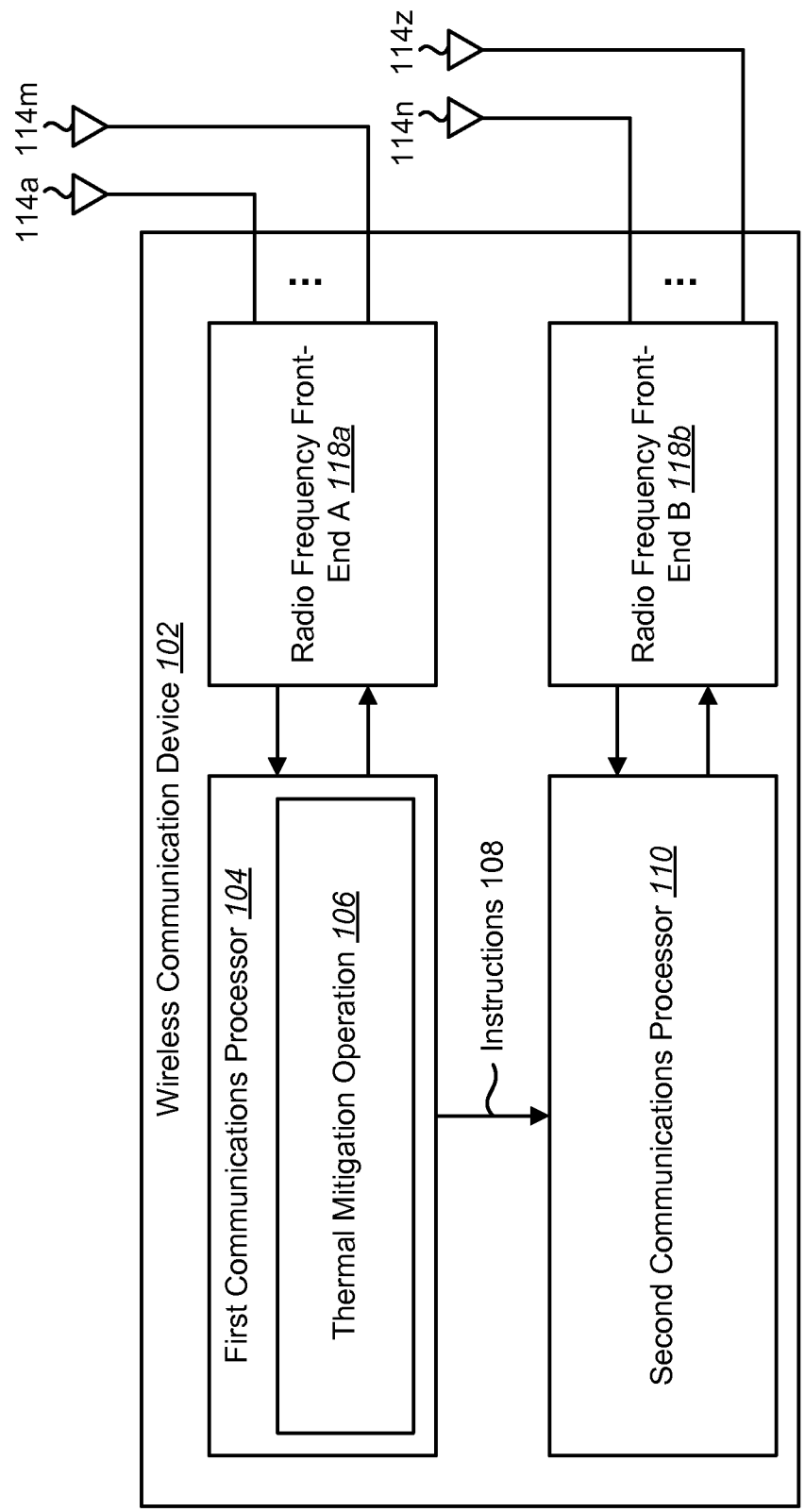
FIG. 1 is a block diagram illustrating one configuration of a wireless communication device in which systems and methods for thermal mitigation with multiple processors may be implemented.

An electronic device that communicates with another electronic device may be referred to as a communication device herein. Examples of communication devices include cellular phones, smartphones, laptop computers, mobile devices, cellular telephone base stations or nodes, access points, wireless gateways and wireless routers. In some configurations, communication devices may operate in accordance with one or more industry standards, such as the 3$^{rd}$ Generation Partnership Project (3GPP) Release-8 (Rel-8), 3GPP Release-9 (Rel-9), 3GPP Release-10 (Rel-10), Long Term Evolution (LTE), LTE-Advanced (LTE-A), Global System for Mobile Communications (GSM), General Packet Radio Service (GPRS), Enhanced Data Rates for GSM Evolution (EDGE), Time Division Long-Term Evolution (TD-LTE), Time Division Synchronous Code Division Multiple Access (TD-SCDMA), Frequency-Division Duplexing Long-Term Evolution (FDD-LTE), Universal Mobile Telecommunications System (UMTS), GSM EDGE Radio Access Network (GERAN), Global Positioning System (GPS), etc. Other examples of standards that a communication device may comply with include Institute of Electrical and Electronics Engineers (IEEE) 802.11a, 802.11b, 802.11g, 802.11n and/or 802.11ac (e.g., Wireless Fidelity or "Wi-Fi") standards, IEEE 802.16 (e.g., Worldwide Interoperability for Microwave Access or "WiMAX") standards, CDMA 2000 1× standards (which may utilize Code Division Multiple Access (CDMA)), Evolution-Data Optimized (EVDO) standards, Interim Standard 95 (IS-95), evolved High Rate Packet Data (eHRPD) radio standards and others.

Some of the systems and methods disclosed herein may be described in terms of one or more standards. However, this should not limit the scope of the disclosure, as the systems and methods may be applicable to many systems and/or standards. For example, the term wireless communication device may be used to refer to a user equipment (UE) and/or station. Furthermore, the term base station may be used to refer to one or more of the terms Node B, Evolved Node B (eNB), Home Evolved Node B (HeNB), access point, etc.

Data transmission over LTE may be more power hungry than GSM technology. For example, LTE may provide a very high data rate. Accordingly, a wireless communication device may produce increased heat if it remains connected over LTE for a long time. In a known approach for thermal mitigation, a device (e.g., a single communications processor) enters a mode where only emergency calls are supported. In this mode, a user is not allowed to send text (e.g., Short Message Service (SMS)) messages or even a low amount of data if the device enters this emergency-only mode. This may cause a poor user experience if the user wants to make a data call, even if it requires very low data throughput. However, many applications that require very low data throughput may still be supported in accordance with the systems and methods disclosed herein.

The systems and methods disclosed herein describe thermal mitigation with multiple processors. For example, in a dual modem or processor architecture, data traffic may be effectively transferred from one modem or processor that is causing higher thermal emission to another modem or processor (in an idle state, for example) in order to reduce thermal emissions. For instance, a data call may be automatically transferred from one modem or processor to another modem or processor in a particular thermal mitigation state.

In one example of the systems and methods disclosed herein, a GSM modem or communications processor may be activated for a data call before an LTE modem or communications processor becomes very hot. In some configurations, shutting down the LTE modem and transferring data calls from the LTE modem to the GSM modem may be based on a thermal threshold setting. This way, the LTE modem or communications processor may get a chance to cool down, while lower speed data traffic may still be supported over the GSM modem. Once the LTE modem or communications processor becomes cooler (e.g., drops below a threshold value), it can be re-activated. For example, data calls may be transferred back from the GSM modem or communications processor to the LTE modem or communications processor.

This approach may improve user experience compared with the whole device entering emergency-only mode. Accordingly, the systems and methods disclosed herein may provide a mechanism to avoid the device reaching an excessively high temperature and also improve user experience by continuing to allow a data call even at a slower rate.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed but is merely representative of the systems and methods. Features and/or elements depicted in a Figure may be combined with one or more features and/or elements depicted in one or more other Figures.

FIG. 1 is a block diagram illustrating one configuration of a wireless communication device 102 in which systems and methods for thermal mitigation with multiple processors 104, 110 may be implemented. The wireless communication device 102 may also be referred to as and/or may include some or all of the functionality of a terminal, an access terminal, a subscriber unit, a station, a user equipment, etc. Examples of wireless communication devices 102 include a cellular phone, a personal digital assistant (PDA), a wireless device, a wireless modem, a handheld device, a laptop computer, a session initiation protocol phone, a wireless local loop (WLL) station, etc.

In some implementations of the systems and methods disclosed herein, a wireless communication device 102 may include two or more communications processors 104, 110 (e.g., modems or processors). In some configurations, one of the processors may operate at a higher clock rate than another processor. For example, a first communications processor 104 may be utilized to support data calls over LTE and TD-SCDMA, while a second communications processor 110 may be utilized to support voice calls over GSM. In certain scenarios, the LTE modem (e.g., the first communications processor 104) may become very hot due to high thermal emissions.

The wireless communication device 102 may also include radio frequency (RF) front-end A 118a, RF front-end B 118b and one or more antennas 114a-z. The wireless communication device 102 may communicate with one or more other devices (e.g., a base station). For example, the wireless communication device 102 and a base station may communicate with each other by transmitting and/or receiving electromagnetic signals.

The first communications processor 104 may include a thermal mitigation operation block/module 106 that performs a thermal mitigation operation. As used herein, the phrase "block/module" indicates that a particular component may be implemented in hardware, software or a combination of both. For example, the thermal mitigation operation block/module 106 may be implemented with hardware components such as circuitry and/or software components such as instructions or code, etc.

A thermal mitigation operation may be an operation that may reduce heat or thermal emissions. In some implementations, the first communications processor 104 may perform a thermal mitigation operation by sending instructions 108 to the second communications processor 110. The instructions 108 may direct or control the second communications processor 110 in order to reduce heat or thermal emissions. For example, the first communications processor 104 may offload and/or limit streaming data traffic. Additionally or alternatively, the first communications processor 104 may send instructions 108 that direct the second communications processor 110 to only allow voice calls. Similarly, the instructions 108 may direct the second communications processor 110 to only allow emergency communications. The instructions 108 may also direct the second communications processor 110 to perform packet data communications (e.g., a data call) in place of the first communications processor 104. As will be described in detail below, examples of thermal mitigation operations include, but are not limited to, reducing a processing clock speed, reducing a processor receive data rate, reducing a processor transmit data rate, slowing down a data call, offloading a data call and stopping a data call.

In some implementations, the first communications processor 104 may perform a thermal mitigation operation when a thermal threshold is reached. For example, the first communications processor 104 may reduce a processor transmit data rate (e.g., from 20 megabits per second (Mbps) to 15 Mbps) when the temperature of the wireless communication device 102 (or a wireless communication device 102 component (e.g., the first communications processor 104)) is at least equal to a thermal threshold. In some implementations, the first communications processor 104 may perform one or more thermal mitigation operations when one or more thermal thresholds are reached. For instance, the first communications processor 104 may send one or more instructions when one or more thermal thresholds are reached. In these cases, the instructions may be based on at least one thermal threshold. For example, if the temperature of the wireless communication device 102 (or a component of the wireless communication device 102) is greater than a first threshold, the first communications processor 104 may send a first set of instructions 108 to the second communications processor 110. Similarly, if the temperature of the wireless communication device 102 (or a component of the wireless communication device 102) is greater than a second threshold, the first communications processor 104 may send a second set of instructions 108 to the second communications processor 110. In some implementations, the first set of instructions 108 may be different than the second set of instructions 108. For example, the first set of instructions 108 may direct the second communications processor 110 to allow only voice calls and the second set of instructions 108 may direct the second communications processor 110 to allow only emergency communications.

In some implementations, the first communications processor 104 may perform multiple thermal mitigation operations when a thermal threshold is reached. For example, when the temperature of the wireless communication device 102 is greater than a thermal threshold, the wireless communication device 102 may reduce the transmit data rate and disable streaming data traffic. It should be noted that in addition to the examples described herein, any combination of any number of thermal mitigation operations (including sending instructions) may be performed when any number of thermal thresholds are reached.

The first communications processor 104 may process a data call. For example, the first communications processor 104 may be coupled to RF front-end A 118a, which may be coupled to one or more antennas 114a-m. The antennas 114a-m and RF front-end A 118a may allow the wireless communication device 102 to communicate with other wireless communication devices 102. RF front-end A 118a may include circuitry for duplexing, diplexing and/or amplification, etc. In some implementations, the first communications processor 104 may manage specific communication content. For example, the first communications processor 104 may manage data calls. The first communications processor 104 may process a data call according to a particular standard. For example, the first communications processor 104 may process data according to LTE specifications.

The second communications processor 110 may be coupled to the first communications processor 104. The second communications processor 110 may be coupled to RF front-end B 118b, which may be coupled to one or more antennas 114n-z. The antennas 114n-z and RF front-end B 118b may allow the wireless communication device 102 to communicate with other wireless communication devices 102. RF front-end B 118b may include circuitry for duplexing, diplexing and/or amplification, etc. In some implementations, the second communications processor 110 may manage specific communication content. For example, the second communications processor 110 may manage voice calls and/or data calls. In some implementations, the second communications processor 110 may manage a voice call according to a particular standard. For example, the second communications processor 110 may process voice calls according to GSM specifications.

In some implementations, the second communications processor 110 may not have independent thermal mitigation capabilities. For example, the second communications processor 110 may not be implemented or designed to perform any thermal mitigation operation independently. Alternatively, the second communications processor 110 may have thermal mitigation capabilities that are not as efficient (e.g., a delayed response to a thermal indication above a thermal threshold) as the thermal mitigation capabilities of the first communications processor 104. As described herein, in these examples, the second communications processor 110 may rely on the first communications processor 104 to direct or control the second communications processor 110 in order to reduce heat or thermal emissions. For example, the second communications processor 110 may not be specially configured (e.g., it 110 may be in a standard configuration). In this case, the first communications processor 104 may provide the instructions 108 in a format that can be executed by the second communications processor 110 without specialized hardware and/or software. These configurations may reduce implementation costs by utilizing a commercially available processor for the second communications processor 110.

In some implementations, the first communications processor 104 may be capable of operating at a higher clock rate than the second communications processor 110. Additionally or alternatively, the second communications processor 110 may be capable of operating at lower data rates than the first communications processor 104. For example, the first communications processor 104 may be capable of operating at LTE data rates and the second communications processor 110 may be capable of operating at GSM data rates. As will be described below, the first communications processor 104 may transfer packet data communication operation to the second communications processor 110 in order to provide packet data communications at data rates below minimum LTE data rates.

Figure 2:
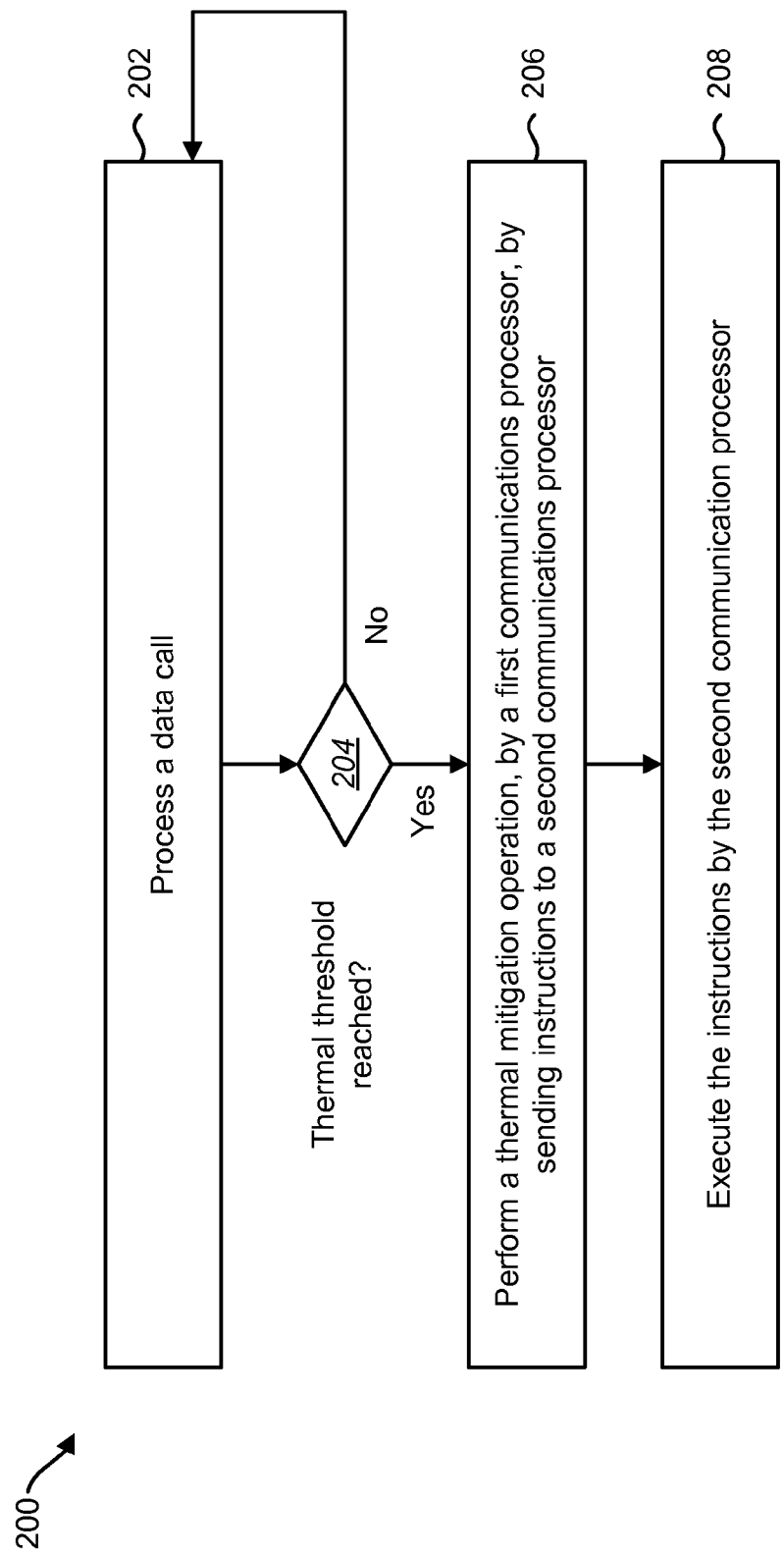
FIG. 2 is a flow diagram illustrating one configuration of a method for thermal mitigation with multiple processors.

FIG. 2 is a flow diagram illustrating one configuration of a method 200 for thermal mitigation with multiple processors 104, 110. The method may be performed by the wireless communication device 102. The wireless communication device 102 (via the first communications processor 104, for instance) may process 202 a data call. For example, the wireless communication device 102, via the antennas 114a-m and RF front-end A 118a, may receive/transmit data from/to one or more communication devices (e.g., base stations). Processing 202 a data call may include managing data call parameters including, but not limited to, transmit data rates, receive data rates and processing clock speed. In some implementations, the wireless communication device 102 may process 202 the data call in accordance with a particular standard (e.g., LTE).

The wireless communication device 102 (via the first communications processor 104, for example) may determine 204 whether a thermal threshold is reached. In some implementations, the thermal threshold may be a threshold temperature for the wireless communication device 102, or a thermal threshold for a wireless communication device 102 component (e.g., the core temperature of the first communications processor 104). For example, the wireless communication device 102 may receive a thermal indication (e.g., temperature) of the wireless communication device 102 or of at least one wireless communication device 102 component. If the thermal indication is at least equal to the threshold temperature, the wireless communication device 102 may determine 204 that the thermal threshold is reached. Otherwise, the wireless communication device 102 (e.g., the first communications processor 104) may determine 204 that the thermal threshold has not been reached. It should be noted that the thermal indication and/or the thermal threshold may be in units of degrees Fahrenheit, Celsius, Kelvin or other units. Additionally or alternatively, the thermal indication and/or the thermal threshold may be indicated by a voltage, a current, a code, bits, etc.

If the wireless communication device 102 determines 204 that the thermal threshold has not been reached, the wireless communication device 102 may continue to process 202 the data call as normal (e.g., without changing any processing parameters (e.g. transmit data rate, receive data rate and/or processing clock speed)). The wireless communication device 102 may return to determine 204 whether the thermal threshold is reached (e.g., obtaining a thermal indication and comparing the thermal indication to a threshold temperature). In this implementation, the wireless communication device 102 may process 202 the data call as normal until the wireless communication device 102 determines 204 that the thermal threshold has been reached.

If the wireless communication device 102 determines 204 that the thermal threshold has been reached, then the first communications processor 104 may perform 206 a thermal mitigation operation by sending instructions 108 to a second communications processor 110. The thermal mitigation operation may be performed by a first communications processor 104. The instructions 108 may direct the second communications processor 110 to perform one or more operations. For instance, the first communications processor 104 may send instructions to the second communications processor 110 that direct the second communications processor 110 to perform an operation in order to reduce heat and/or thermal emissions. The instructions 108 may be related to or based on the data call. For example, the instructions 108 may relate to transferring (e.g., offloading) all or part of the data call to the second communications processor 110, may relate to disabling streaming data traffic, may relate to allowing only non-streaming data traffic and/or may relate to suspending the data call while only allowing voice calls (and/or emergency voice calls). A data call may be a data transaction (e.g., transmission and/or reception) between the wireless communication device 102 and another device (e.g., base station). In some implementations, a data call (e.g., a packet data call) may use packet switch (PS) technology, which allows second generation (2G), third generation (3G), wideband code division multiple access (WCDMA) and LTE mobile devices, and corresponding networks, to transmit internet protocol packets to external networks such as the Internet. For example, GPRS may be a packet switch (PS) technology and may be an integrated part of the GSM network switching subsystem. By comparison, for voice calls, a circuit switch (CS) technology may be used.

In one example, the instructions 108 may direct the second communications processor 110 to only allow emergency communications. For instance, the instructions 108 may direct the second communications processor 110 to disable operations related to data traffic and voice call traffic except for emergency phone calls (to "911," for instance). In another example, the instructions may include instructions related to transferring packet data communication operation to the second communications processor 110. For example, the instructions 108 may direct the second communications processor 110 to perform packet data communications in place of the first communications processor 104. In other words, the first communications processor 104 may offload data call processing to the second communications processor 110. As will be described below, the first communications processor 104 may provide data to enable the second communications processor 110 to take over packet data communications.

In another example, the instructions 108 may direct the second communications processor 110 to disable all or some streaming data traffic (e.g., streaming video and/or audio). In yet another example, the instructions 108 may direct the second communications processor 110 to only allow voice calls. For instance, the instructions 108 may direct the second communications processor 110 to disable operations related to data traffic. In some implementations, the wireless communication device 102 may send any number of the instructions described herein or any other instruction that may result in reduced heat or thermal emissions to the second communications processor 110 when the thermal threshold is reached.

As will be described below, performing 206 a thermal mitigation operation may include, but is not limited to, reducing processing clock speed (for the first communications processor 104, for example), offloading some (or all) of a data call, reducing a receive data rate and reducing a transmit data rate. The wireless communication device 102 may perform 206 any combination of any number of thermal mitigation operations when the wireless communication device 102 determines 204 that the thermal threshold is reached. For example, the first communications processor 104 may send one or more instructions to the second communications processor 110 and the first communications processor 104 may also perform at least one of reducing processing clock speed, reducing transmit data rate, reducing receive data rate and any other thermal mitigation operation.

It should be noted that in some configurations, multiple thermal thresholds with corresponding thermal mitigation operations may be implemented. For example, if a first thermal threshold is reached, the first communications processor 104 may reduce a receive data rate by offloading a data call to the second communications processor 110. If a second thermal threshold is reached, the first communications processor 104 may disable streaming traffic (e.g., video streaming, audio streaming, etc.) while allowing other browsing traffic (by the second communications processor 110, for example). If a third thermal threshold is reached, the first communications processor 104 may disable data services while still allowing voice calls by the second communications processor 110, for instance. If yet another thermal threshold is reached, the first communications processor 104 may disable all services except emergency communications. The procedures described herein may be applied at one or more thermal thresholds (e.g., when one or more temperature thresholds are reached) depending on the implementation.

The second communications processor 110 may receive and execute 208 the instructions 108. For example, the second communications processor 110 may operate in accordance with the instructions 108 sent by the first communications processor 104. For example, the second communications processor 110 may disable all services except emergency communications or take over packet data communication operation (e.g., a data call) in place of the first communications processor 104 as indicated in the instructions 108.

Figure 3:
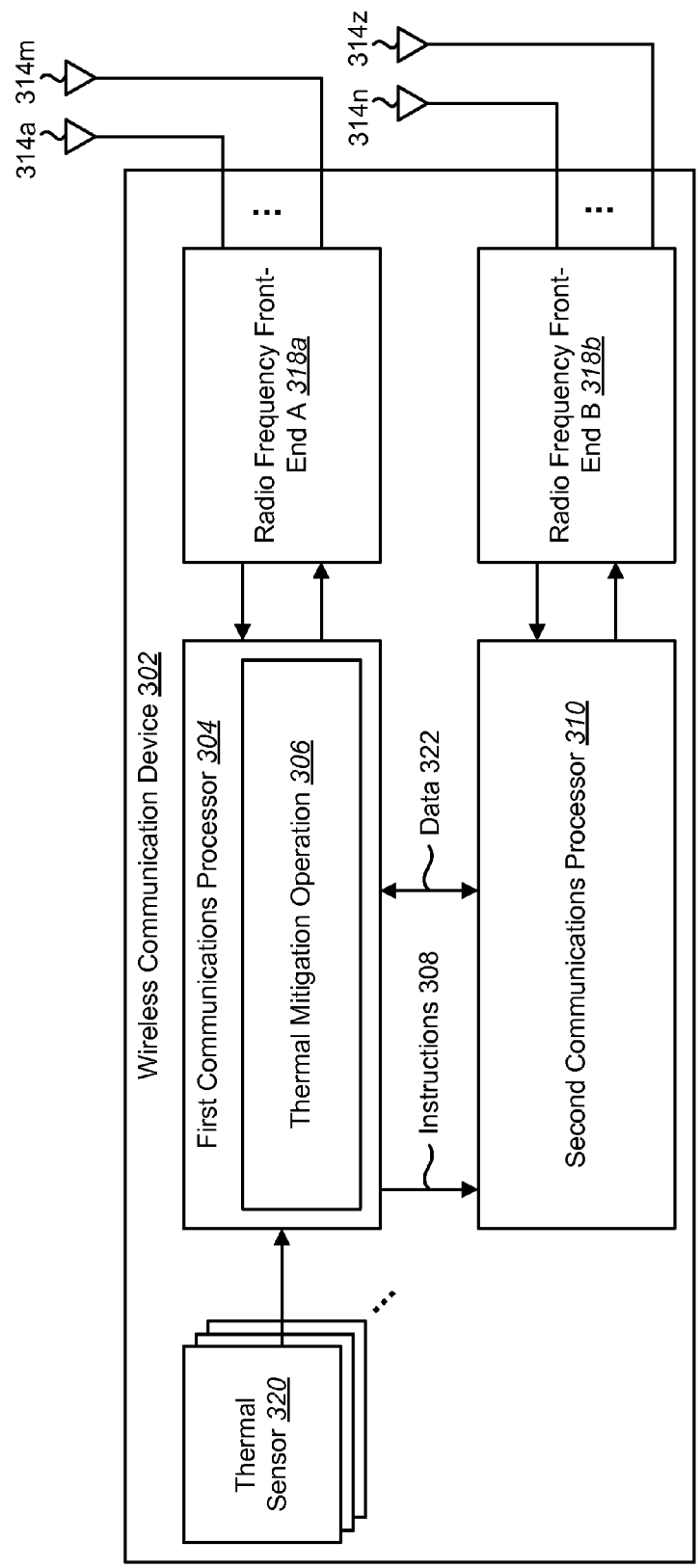
FIG. 3 is a block diagram illustrating a more specific configuration of a wireless communication device in which systems and methods for thermal mitigation with multiple processors may be implemented.

FIG. 3 is a block diagram illustrating a more specific configuration of a wireless communication device 302 in which systems and methods for thermal mitigation with multiple processors 304, 310 may be implemented. The wireless communication device 302 may be an example of the wireless communication device 102 described in connection with FIG. 1. The wireless communication device 302 may include a first communications processor 304, a thermal mitigation operation block/module 306, a second communications processor 310, RF front-end A 318a, RF front-end B 318b and/or one or more antennas 314a-z that may be examples of corresponding elements described in connection with FIG. 1.

One or more thermal sensors 320 may be included in and/or coupled to the first communications processor 304. For example, the one or more thermal sensors 320 may be distinct from the first communications processor 304 as depicted in FIG. 3. In this example, the one or more thermal sensors 320 may be coupled to the first communications processor 304. In other examples, the one or more thermal sensors 320 may be integrated with the first communications processor 304.

The one or more thermal sensors 320 may obtain a thermal indication. Examples of the thermal indication include a temperature reading and/or a signal (e.g., voltage or current signal) that indicates temperature, heat and/or changes thereof. For instance, the one or more thermal sensors 320 may obtain a temperature of the wireless communication device 302. In these examples, the one or more thermal sensors 320 may provide the thermal indication to the first communications processor 304. The first communications processor 304 may then determine whether the thermal indication is at least equal to a thermal threshold and send instructions accordingly, as described herein.

The first communications processor 304 may send instructions 308 to the second communications processor 310 that may be an example of the instructions 108 described in connection with FIG. 1. Additionally, the first communications processor 304 may send data 322 to the second communications processor 310. The data 322 may be associated with the data call that the first communications processor 304 is processing. For example, the first communications processor 304 (e.g., an LTE modem) may send (e.g., offload) packet data 322 to the second communications processor 310. In this example, the second communications processor 310 may manage the data call associated with the data 322 in place of the first communications processor. In some implementations, the data 322 may include session information associated with a data call. For example, the first communications processor 304 may send an Internet Protocol (IP) address, server identification, authentication information and/or other control information associated with a data call to enable the second communications processor 310 to manage the data call.

In some implementations, the first communications processor 304 may provide data 322 based on a thermal indication. An example is given as follows. If a wireless communication device 302 determines that the thermal indication is greater than a thermal threshold, the first communications processor 304 may perform a thermal mitigation operation, for example, by reducing a transmit data rate, to reduce heat or thermal emissions. In some implementations of this example, the first communications processor 304 may not be able to reduce the transmit data rate below a certain rate (per LTE specifications, for example). In this example, the first communications processor 304 may offload the data call to the second communications processor 310 by sending data 322 associated with the data call to the second communications processor 310.

In some implementations, the second communications processor 310 may send data 322 associated with the data call to the first communications processor 304. For example, the second communications processor 310 may send data 322 associated with the data call to the first communications processor 304 when the thermal indication indicates that the wireless communication device 302 (or a wireless communication device 302 component) temperature is less than the threshold temperature.

Figure 4:
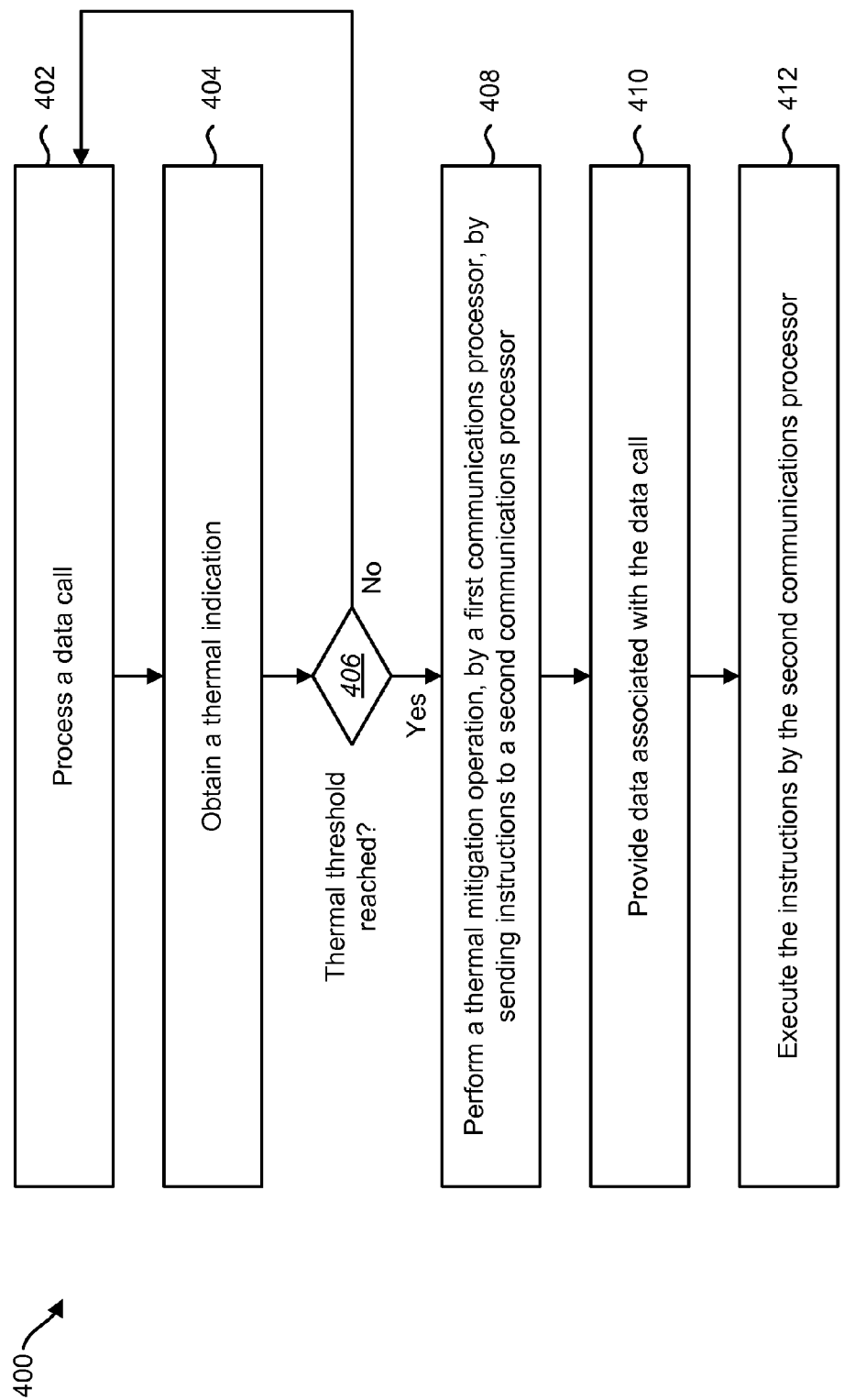
FIG. 4 is a flow diagram illustrating a more specific configuration of a method for thermal mitigation with multiple processors.

FIG. 4 is a flow diagram illustrating a more specific configuration of a method 400 for thermal mitigation with multiple processors 304, 310. The method may be performed by the wireless communication device 302. The wireless communication device 302 may process 402 a data call. In some implementations, this may be done as described in connection with FIG. 2.

The wireless communication device 302 may obtain 404 a thermal indication. This may be accomplished as described above in some configurations. For example, the wireless communication device 302 may obtain 404 the thermal indication from one or more thermal sensors 320 that may be included in and/or coupled to the first communications processor 304. For example, the one or more thermal sensors 320 may obtain a temperature of the wireless communication device 302 or one or more wireless communication device 302 components and provide the thermal indication to the first communications processor 304.

The wireless communication device 302 may determine 406 whether a thermal threshold is reached. In some implementations, this may be done as described in connection with FIG. 2.

If the wireless communication device 302 determines 406 that the thermal threshold has not been reached, the wireless communication device 302 may continue to process 402 the data call as normal (e.g., without changing any processing parameters (e.g. transmit data rate, receive data rate and/or processing clock speed)). In this implementation, the wireless communication device 302 may process 402 the data call as normal until the wireless communication device 302 determines 406 that the thermal threshold has been reached.

If the wireless communication device 302 determines 406 that the thermal threshold is reached, the wireless communication device 302 may perform 408 a thermal mitigation operation by sending instructions 308 to a second communications processor 310. In some implementations, this may be done as described in connection with FIG. 2.

The first communications processor 304 may provide 410 data 322 associated with the data call. For example, the first communications processor 304 may provide 410 (e.g., offload) data 322 associated with the data call to the second communications processor 310. For instance, the first communications processor 304 may provide session information (e.g., an IP address, authentication information, server identification, other control information, etc.) to enable the second communications processor 310 to take over packet data communications. In some implementations, the first communications processor 304 may also provide packet data 322 (e.g., outgoing packets, payload data, etc.) to the second communications processor 310. Accordingly, the first communications processor 304 may transfer packet data communication operation to the second communications processor 310. In some configurations, the first communications processor 304 may provide 410 the data associated with the call by directly sending the data to the second communications processor 310 (via an internal bus, for example). Additionally or alternatively, the first communications processor 304 may provide 410 the data associated with the call by sending one or more references (e.g., memory pointers, addresses, etc.) that indicate the data to the second communications processor 310.

In some implementations, the first communications processor 304 provides 410 data 322 associated with the data call based on a thermal indication. For example, the first communications processor 304 may provide 410 data 322 when the thermal indication is at least equal to a thermal threshold (until the first communications processor 304 temperature is less than a threshold temperature, for example).

The second communications processor 310 may execute 412 the instructions 308. In some implementations, this may be done as described in connection with FIG. 2.

Figure 5:
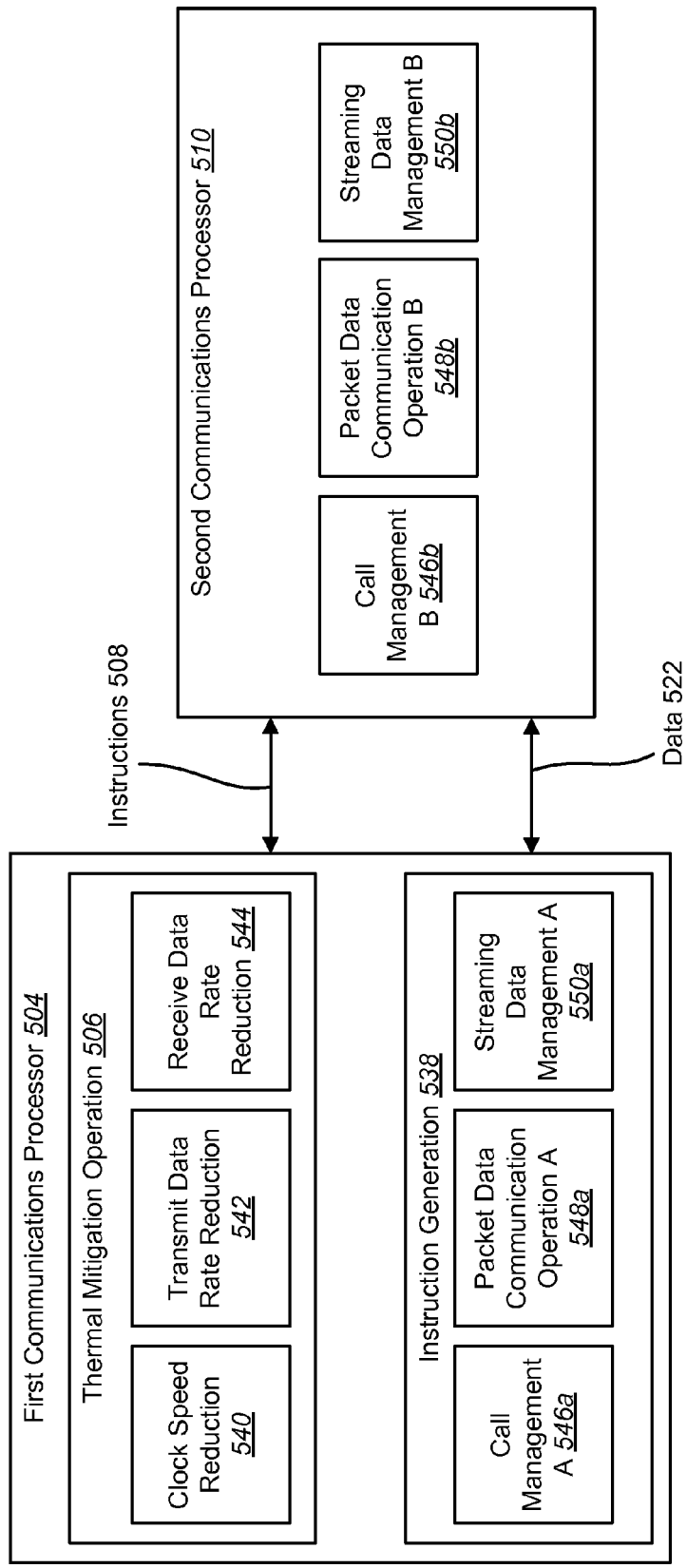
FIG. 5 is a block diagram illustrating one configuration of communications processors in which systems and methods for thermal mitigation with multiple processors may be implemented.

FIG. 5 is a block diagram illustrating one configuration of communications processors 504, 510 in which systems and methods for thermal mitigation with multiple processors 504, 510 may be implemented. The first communications processor 504, the second communications processor 510, the thermal mitigation operation block/module 506, the instructions 508 and the data 522 may be examples of corresponding elements described in connection with one or more of FIGS. 1 and 3.

In some implementations, the thermal mitigation operation block/module 506 may include a clock speed reduction block/module 540, a transmit data rate reduction block/module 542 and/or a receive data rate reduction block/module 544. The clock speed reduction block/module 540 may reduce a processing clock speed to reduce heat or thermal emissions. For example, the clock speed reduction block/module 540 may reduce a processing clock speed of the first communications processor 504 to reduce the heat or thermal emissions of the first communications processor 504.

The transmit data rate reduction block/module 542 may reduce the rate of data transmission in the first communications processor 504 to reduce heat or thermal emissions. For example, the transmit data rate reduction block/module 542 may reduce the data transmission rate from approximately 20 Mbps to 15 Mbps to allow the first communications processor 504 to cool down. In some implementations, the transmit data rate reduction block/module 542 may reduce the data transmission rate down to a certain rate (per LTE specifications, for example). In this example, if the wireless communication device 102 thermal indication (or a wireless communication device 102 component thermal indication), is still at least equal to the thermal threshold, the first communications processor 504 may, among other thermal mitigation operations, offload a data call. For example, the first communications processor 504 may not be able to reduce a processor transmit data rate below a certain rate. In this example, the first communications processor 504 may offload the data call to the second communications processor 510.

The receive data rate reduction block/module 544 may reduce the rate of data reception in the first communications processor 504 to reduce heat or thermal emissions. For example, the receive data rate reduction block/module 544 may reduce the data reception rate from approximately 20 Mbps to 15 Mbps to allow the first communications processor 504 to cool down. In some implementations, the receive data rate reduction block/module 544 may reduce the data reception rate down to a certain rate (per LTE specifications, for example). In this example, if the wireless communication device 102 thermal indication (or a wireless communication device 102 component thermal indication) is still at least equal to the thermal threshold, the first communications processor 504 may, among other thermal mitigation operations, offload a data call. For example, the first communications processor 504 may not be able to reduce a processor receive data rate below a certain rate. In this example, the first communications processor 504 may offload the data call to the second communications processor 510. It should be noted that while FIG. 5 depicts a clock speed reduction block/module 540, a transmit data rate reduction block/module 542 and a receive data rate reduction block/module 544; any number of blocks/modules that perform a thermal mitigation operation may be included in the first communications processor 504.

In some implementations, the first communications processor 504 may include an instruction generation block/module 538 that may generate the instructions 508 that may be sent to the second communications processor 510. The instruction generation block/module 538 may include call management block/module A 546*a* that generates instructions 508 directing the second communications processor 510 how to manage calls. For example, call management block/module A 546*a* may generate instructions that direct the second communications processor 510 to only allow voice calls and/or to only allow emergency communications.

The instruction generation block/module 538 may include packet data communication operation block/module A 548*a* that may generate instructions 508 that direct the second communications processor 510 how to operate a packet data communication. For example, packet data communication operation block/module A 548*a* may generate instructions 508 that direct the second communications processor 510 to operate a packet data communication in place of the first communications processor 504.

The instruction generation block/module 538 may include streaming data management block/module A 550*a* that may generate instructions 508 that direct the second communications processor 510 how to manage streaming data traffic. For example, streaming data management block/module A 550*a* may generate instructions 508 that direct the second communications processor 510 to disable streaming data traffic. It should be noted that in addition to the block/modules depicted in FIG. 5, any number of block/modules that generate instructions 508 to be sent to the second communications processor 510 may be included in the first communications processor 504.

In some implementations, the second communications processor 510 may include call management block/module B 546*b* that executes instructions 508 that direct the second communications processor 510 how to manage calls. For example, call management block/module B 546*b* may execute instructions 508 that direct the second communications processor 510 to only allow voice calls and/or to only allow emergency communications. The second communications processor 510 may include packet data communication operation block/module B 548*b* that may execute instructions 508 that direct the second communications processor 510 how to operate a packet data communication. For example, packet data communication operation block/module B 548*b* may execute instructions 508 that direct the second communications processor 510 to operate a packet data communication in place of the first communications processor 504. The second communications processor 510 may include streaming data management block/module B 550*b* that may execute instructions 508 that direct the second communications processor 510 how to manage streaming data traffic. For example, streaming data management block/module B 550*b* may execute instructions 508 that direct the second communications processor 510 to disable streaming data traffic. It should be noted that in addition to the block/modules depicted in FIG. 5, any number of block/modules that execute instructions 508 received from the first communications processor 504 may be included in the second communications processor 510.

Figure 6:
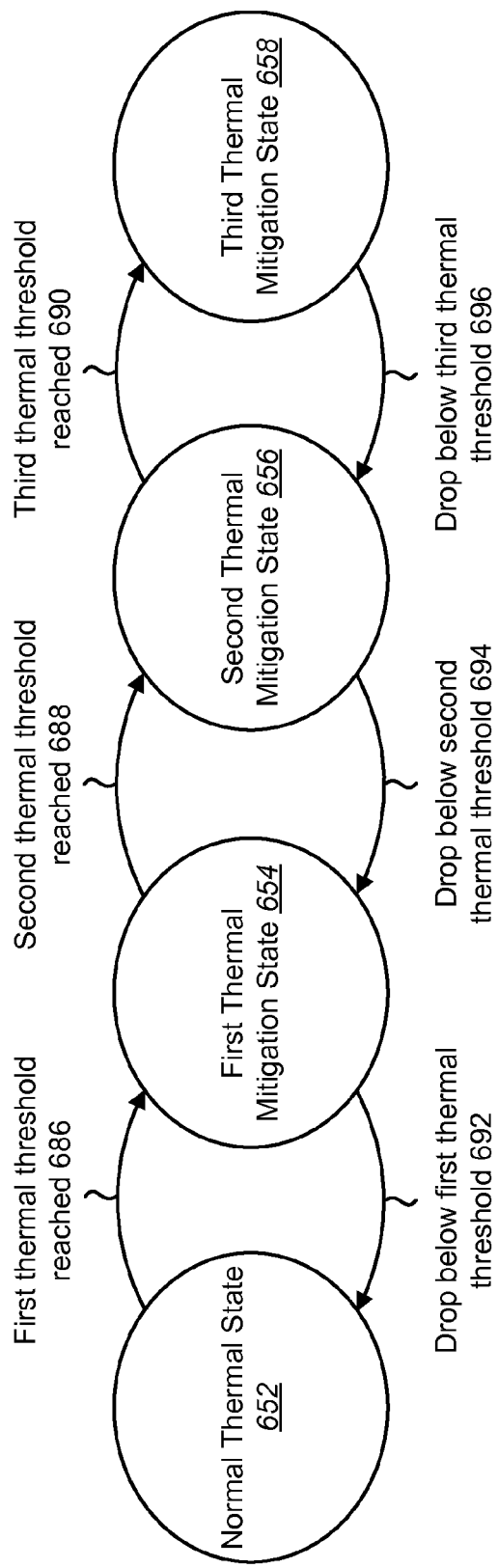
FIG. 6 is a state diagram illustrating multiple thermal mitigation states of a wireless communication device during thermal mitigation with multiple processors.

FIG. 6 is a state diagram illustrating multiple thermal states 652, 654, 656, 658 of a wireless communication device 102 during thermal mitigation with multiple processors 104, 110. As used herein, the term "thermal mitigation state" may refer to a wireless communication device 102 thermal mitigation state and/or at least one wireless communication device 102 component thermal mitigation state. The wireless communication device 102 may operate based on the multiple thermal states 652, 654, 656, 658. In a normal thermal state 652, the wireless communication device 102 may process a data call as normal. For example, the wireless communication device 102 may process a data call without performing a thermal mitigation operation.

If the wireless communication device 102 determines that a first thermal threshold is reached 686, the wireless communication device 102 may enter a first thermal mitigation state 654. In some implementations, in the first thermal mitigation state 654, the wireless communication device 102 may process a data call based on at least one first thermal mitigation operation. For example, if the wireless communication device 102 determines that a second thermal threshold is reached 686, the wireless communication device 102 may send instructions directing the second communications processor 110 to take over the data call. In the first thermal mitigation state 654, the first communications processor 104 may accordingly suspend or discontinue processing the data call.

While in the first thermal mitigation state 654, if the wireless communication device 102 determines that the wireless communication device 102 temperature has dropped below the first thermal threshold 692, the wireless communication device 102 may return to the normal thermal state 652. For example, the first communications processor 104 may enable or resume streaming data traffic. In this case, the first communications processor 104 may discontinue offloading the data call to the second communications processor 110.

If the wireless communication device 102 determines that a second thermal threshold is reached 688, the wireless communication device 102 may enter a second thermal mitigation state 656. In some implementations, in the second thermal mitigation state 656, the wireless communication device 102 may process a data call based on at least one second thermal mitigation operation. For example, if the wireless communication device 102 determines that a second thermal threshold is reached 688, the wireless communication device 102 may send instructions directing the second communications processor 110 to allow only voice calls (e.g., the second thermal mitigation operation). For instance, the first communication processor 104 may direct the second communications processor 110 to discontinue the data call and to allow only voice calls. Accordingly, the wireless communication device 102 may process only voice calls while in the second thermal mitigation state 656.

In this example, if the wireless communication device 102 determines that the wireless communication device 102 temperature has dropped below the second thermal threshold 694, the wireless communication device 102 may return to the first thermal mitigation state 654 (e.g., offloading the data call to the second communications processor 110). In this case, the first communications processor 104 may enable the second communications processor 110 to begin or resume data calls.

If the wireless communication device 102 determines that a third thermal threshold is reached 690, the wireless communication device 102 may enter a third thermal mitigation state 658. In some implementations, in the third thermal mitigation state 658, the wireless communication device 102 may process a data call based on at least one third thermal mitigation operation. For example, if the wireless communication device 102 determines that a third thermal threshold is reached 690, the wireless communication device 102 may send instructions directing the second communications processor 110 to allow only emergency communications (e.g., the third thermal mitigation operation). Accordingly, the wireless communication device 102 may process only emergency communications while in the third thermal mitigation state 658.

In this example, if the wireless communication device 102 determines that the wireless communication device 102 temperature has dropped below the third thermal threshold 696, the wireless communication device 102 may return to the third thermal mitigation state 656. For instance, the first communications processor 104 may instruct the second communications processor 110 to enable or resume non-emergency voice calls.

While FIG. 6 depicts four thermal states 652, 654, 656, 658, a wireless communication device 102 may have any number of thermal mitigation states. For example, the wireless communication device 102 may have an additional thermal mitigation state between the first thermal mitigation state 654 and the second thermal mitigation state 656. In this intervening thermal mitigation state, the first communications processor 104 may offload the data call to the second communications processor 110 and may disable streaming data (e.g., video and/or audio data) traffic processing while still allowing other data (e.g., browsing data, instant messaging data, SMS data, etc.) traffic processing and voice call processing by the second communications processor 110.

Additionally or alternatively, the wireless communication device 102 may include an additional thermal mitigation state beyond the third thermal mitigation state 658, where the first communications processor 104 places the wireless communication device 102 (e.g., the second communications processor 110 and/or the first communications processor 104) in a hibernate or sleep mode. This may help to avoid damaging the wireless communication device 102 (e.g., the processors 104, 110) and/or may provide a user safety feature, for instance.

It should be noted that the thermal mitigation operations performed in successive thermal mitigation states may be cumulative in effect. For example, each successive thermal mitigation operation may further reduce wireless communication device 102 functionality in order to reduce heat. As described in connection with FIG. 6, for instance, the wireless communication device 102 may offload a data call, then disable certain types of data processing (e.g., streaming data traffic), then disable data calls (and only allow voice calls) and then only allow emergency voice calls. In some configurations, the wireless communication device 102 may eventually sleep, hibernate and/or even shut down. It should also be noted that, in some configurations, the first communications processor 104 may unilaterally perform one or more operations (e.g., progressively slowing a data call exclusively on the first communications processor 104) before controlling the second communications processor 110 for thermal mitigation.

Figure 7:
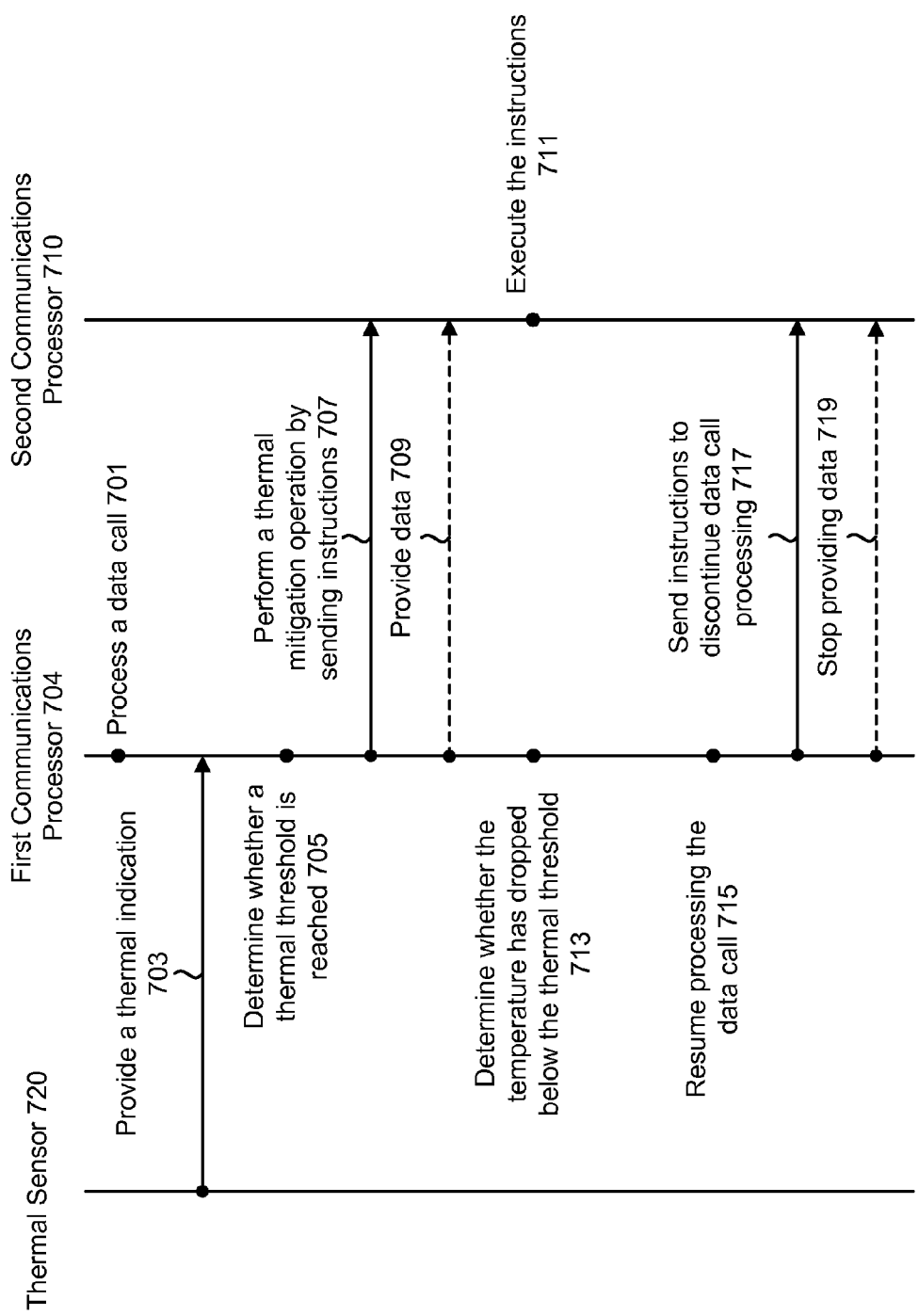
FIG. 7 is a thread diagram illustrating one example of thermal mitigation with multiple processors.

FIG. 7 is a thread diagram illustrating one example of thermal mitigation with multiple processors 704, 710. The first communications processor 704, the second communications processor 710 and the thermal sensor 720 described in connection with FIG. 7 may be examples of corresponding elements described in connection with one or more of FIGS. 1 and 3. The first communications processor 704 may process 701a data call. In some implementations, this may be done as described in connection with FIG. 2.

The thermal sensor 720 may provide 703 a thermal indication. In some implementations, this may be done as described in connection with FIG. 4. After receiving the thermal indication, the first communications processor 704 may determine 705 whether a thermal threshold is reached. In some implementations, this may be done as described in connection with one or more of FIGS. 2 and 4.

If the first communications processor 704 determines 705 that a thermal threshold is reached, the first communications processor 704 may perform 707 a thermal mitigation operation by sending instructions 108 to the second communications processor 710. In some implementations, this may be done as described in connection with FIG. 2.

Optionally, the first communications processor 704 may provide 709 data 322 associated with the data call. As described above, the first communications processor 704 may not be able to perform enough thermal mitigation operations to reduce the wireless communication device 102 temperature below the thermal threshold. For example, the first communications processor 704 may be able to reduce the transmit data rate to a certain rate and the wireless communication device 102 temperature may still be at least equal to the thermal threshold. In this example, the first communications processor 704 may provide 709 data 322 associated with the data call to the second communications processor 710 to enable the second communications processor 710 to manage the data call. In some implementations, this may be done as described in connection with FIG. 4.

After receiving the instructions 108, the second communications processor 710 may execute 711 the instructions 108. In some implementations, this may be done as described in connection with FIG. 2.

At one or more points during thermal mitigation, the first communications processor 704 may determine 713 whether the wireless communication device 102 temperature has dropped below the thermal threshold. If the wireless communication device 102 temperature has dropped below the thermal threshold, the first communications processor 704 may resume 715 processing the data call (e.g., discontinue offloading the data call). For example, the first communications processor 704 may send 717 instructions directing the second communications processor 710 to discontinue processing the data call. Similarly, if the first communications processor 704 provided 709 data 322 to the second communications processor 710, the first communications processor 704 may stop 719 providing data to the second communications processor 710. It should be noted that determining 705 whether a thermal threshold is reached, performing 707 a thermal mitigation operation, providing 709 data 322, executing 711 instructions 108, determining 713 whether the wireless communication device 102 temperature has dropped below the thermal threshold, sending 717 instructions, and stopping 719 providing data may be performed any number of times corresponding to any number of thermal thresholds.

Figure 8:
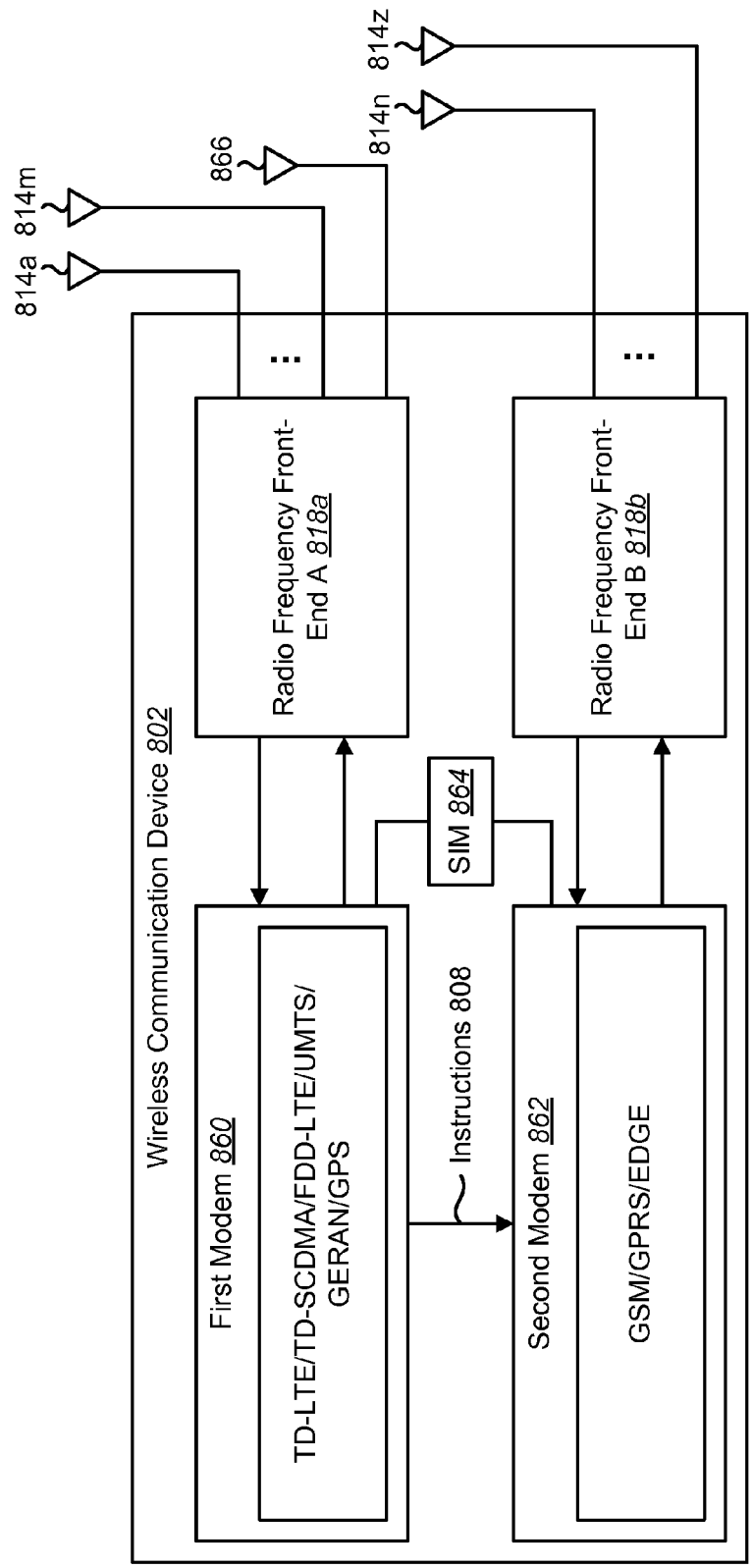
FIG. 8 is a block diagram illustrating another more specific configuration of a wireless communication device in which systems and methods for thermal mitigation with multiple modems may be implemented.

FIG. 8 is a block diagram illustrating one configuration of a wireless communication device 802 in which systems and methods for thermal mitigation with multiple modems 860, 862 may be implemented. The wireless communication device 802 may be an example of the wireless communication device 102 described in connection with FIG. 1. The wireless communication device 802 may include RF front-end A 818a, RF front-end B 818b and/or one or more antennas 814a-z that may be examples of corresponding elements described in connection with FIG. 1. As illustrated in FIG. 8, RF front-end A 818a may provide multiple receive paths to the first modem 860. The wireless communication device 802 may include an antenna 866 that may be dedicated to receiving GPS signals.

The wireless communication device 802 may include a first modem 860. In some implementations, the first modem 860 may be an example of and/or may include some or all of the functionality of the first communications processor 104, 304, 504, 704 described above. For example, the first modem 860 may perform a thermal mitigation operation by sending instructions 808 to the second modem 862 when one or more thermal thresholds are reached. In some implementations, the first modem 860 may provide communication functions in accordance with TD-LTE, TD-SCDMA, FDD-LTE, UMTS, GERAN and GPS, etc. In some configurations, the first modem 860 may include a transmitter and/or receiver (e.g., transmit chain circuitry (such as an encoder, modulator, etc.) and/or receive chain circuitry (such as a decoder, demodulator, etc.)).

The wireless communication device 802 may include a second modem 862. In some implementations, the second modem 862 may be an example of and/or may include some or all of the functionality of the second communications processor 110, 310, 510, 710 described above. For example, the second modem 862 may receive and execute the instructions 808 sent by the first modem 860. In some implementations, the second modem 862 may provide communication functions in accordance with GSM, GPRS and EDGE. Additionally or alternatively, the second modem 862 may provide communication functions in accordance with one or more of second-generation (2G), third-generation (3G) and fourth-generation (4G) wireless technology of 3rd Generation Partnership Project (3GPP) specifications or 3rd Generation Partnership Project 2 (3GPP2) specifications. In some configurations, the second modem 862 may include a transmitter and/or receiver (e.g., transmit chain circuitry (such as an encoder, modulator, etc.) and/or receive chain circuitry (such as a decoder, demodulator, etc.)).

In some implementations, the first modem 860 and/or the second modem 862 may be coupled to a subscriber identity module (SIM) 864. The SIM 864 may provide subscriber (e.g., user) information, authentication information, network information, user contact information, subscription information, etc. This information may enable the wireless communication device 802 to communicate with one or more networks (e.g., base stations). In some implementations, the SIM 864 may indicate that the wireless communication device 802 is receiving services from one or more operators or service providers.

Figure 9:
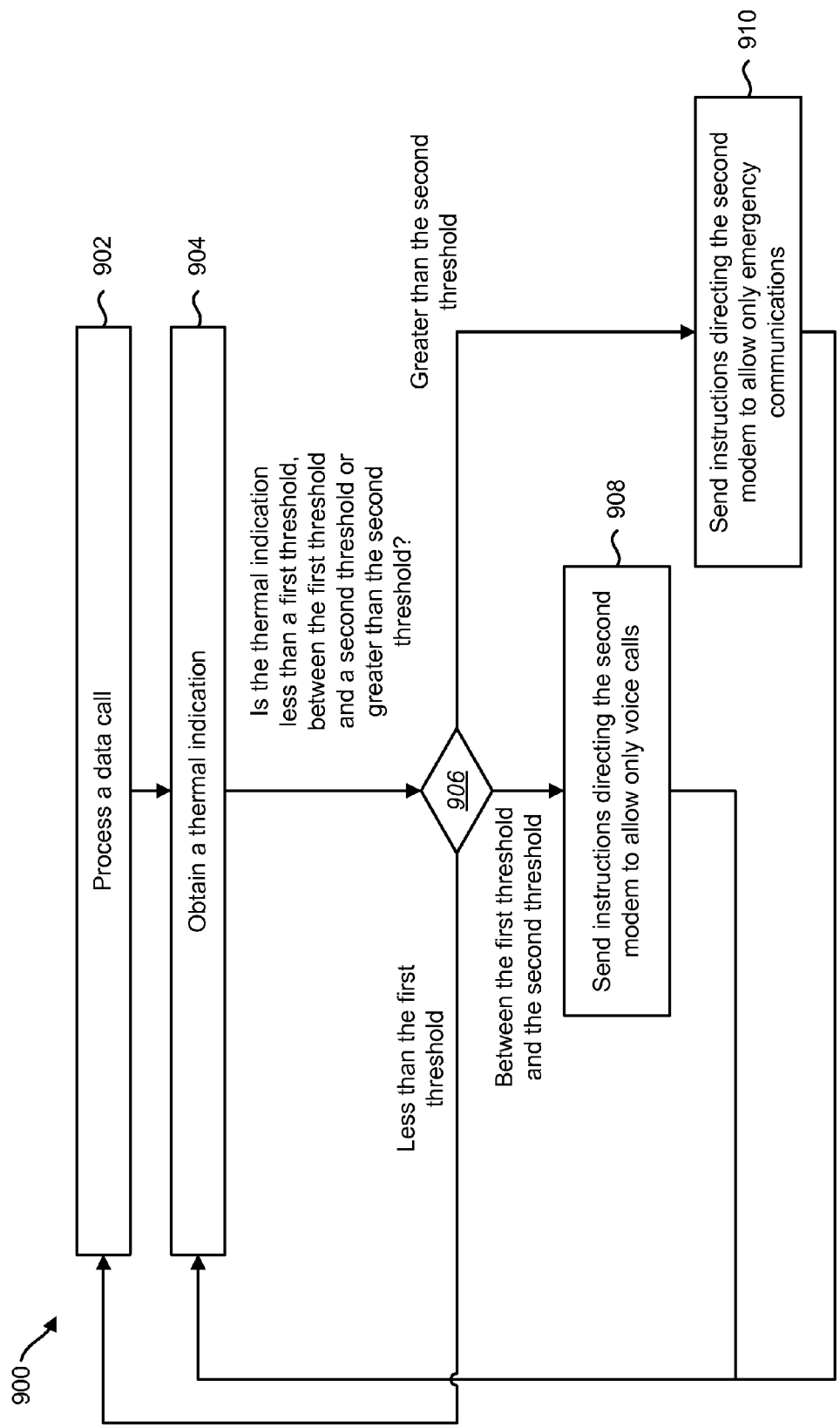
FIG. 9 is a flow diagram illustrating one configuration of a method for thermal mitigation with multiple modems.

FIG. 9 is a flow diagram illustrating one configuration of a method 900 for thermal mitigation with multiple modems 860, 862. The method may be performed by the wireless communication device 802. The wireless communication device 802 processes 902 a data call. In some implementations, this may be done as described in connection with FIG. 2.

The wireless communication device 802 obtains 904 a thermal condition. In some implementations, this may be done as described in connection with FIG. 4.

In some implementations, the wireless communication device 802 determines 906 if the thermal indication is less than a first threshold, between the first threshold and a second threshold or greater than the second threshold. For example, the wireless communication device 802 determines 906 if the temperature of the wireless communication device 802 (or a wireless communication device 802 component) is greater than a first threshold, between the first threshold and a second threshold or greater than a second threshold.

If the wireless communication device 802 determines 906 that the thermal indication is less than the first thermal threshold, the wireless communication device 802 continues to process 902 the data call as normal (e.g., without changing any processing parameters). In some implementations, the wireless communication device 802 returns to obtaining 904 a thermal indication. In this implementation, the wireless communication device 802 may process 902 the data call as normal until the wireless communication device 802 determines 906 that the first thermal threshold has been reached.

If the wireless communication device 802 determines 906 that the thermal indication is between the first thermal threshold and the second thermal threshold, then the first modem 860 sends 908 instructions directing the second modem 862 to allow only voice calls. In some implementations, the wireless communication device 802 may return to obtaining 904 a thermal indication.

If the wireless communication device 802 determines 906 that the thermal indication is greater than the second thermal threshold, then the first modem 860 sends 910 instructions directing the second modem 862 to allow only emergency communications. In some implementations, the wireless communication device 802 may return to obtaining 904 a thermal indication.

Figure 10:
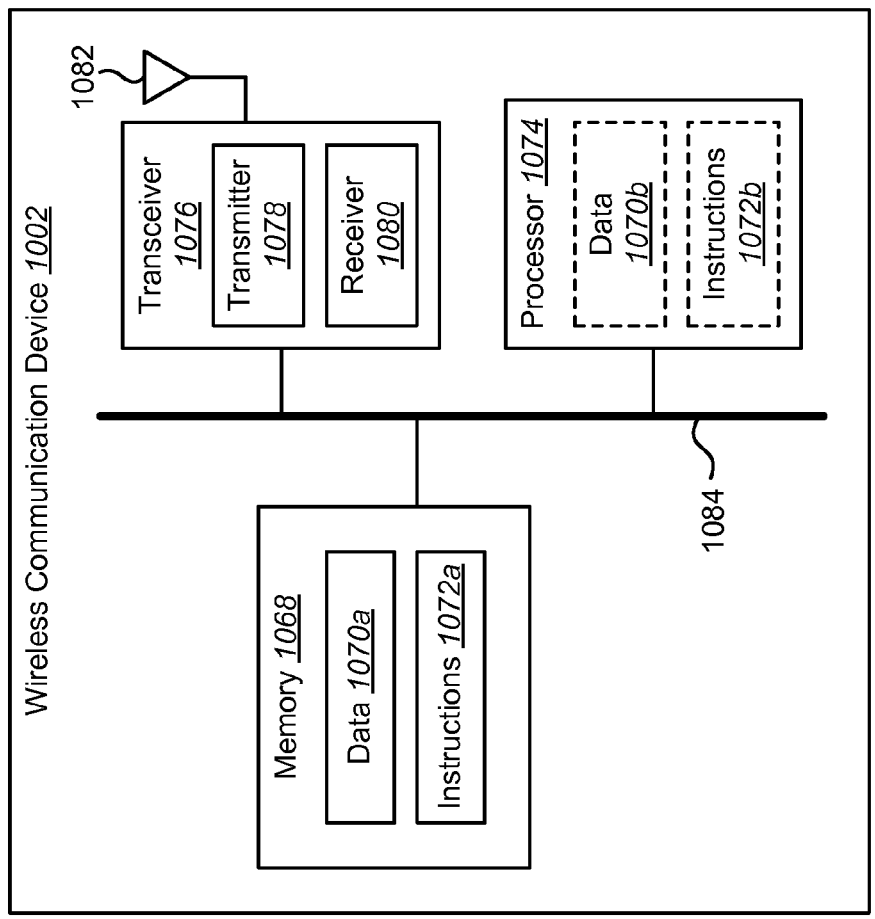
FIG. 10 illustrates certain components that may be included within a wireless communication device.

FIG. 10 illustrates certain components that may be included within a wireless communication device 1002. The wireless communication device 1002 may be implemented in accordance with one or more of the wireless communication devices 102, 302, 802 described above. The wireless communication device 1002 may be an access terminal, a mobile station, a user equipment, etc. The wireless communication device 1002 includes a processor 1074. The processor 1074 may be a general purpose single- or multi-chip microprocessor (e.g., an ARM), a special purpose microprocessor (e.g., a digital signal processor (DSP)), a microcontroller, a programmable gate array, etc. The processor 1074 may be referred to as a central processing unit (CPU). Although just a single processor 1074 is shown in the wireless communication device 1002 of FIG. 10, in an alternative configuration, a combination of processors (e.g., an ARM and DSP) could be used.

The wireless communication device 1002 also includes memory 1068. The memory 1068 may be any electronic component capable of storing electronic information. The memory 1068 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers and so forth, including combinations thereof.

Data 1070a and instructions 1072a may be stored in the memory 1068. The instructions 1072a may be executable by the processor 1074 to implement one or more of the methods 200, 400, 900 disclosed herein. Executing the instructions 1072a may involve the use of the data 1070a that is stored in the memory 1068. When the processor 1074 executes the instructions 1072a, various portions of the instructions 1072b may be loaded onto the processor 1074, and various pieces of data 1070b may be loaded onto the processor 1074.

The wireless communication device 1002 may also include a transmitter 1078 and a receiver 1080 to allow transmission and reception of signals to and from the wireless communication device 1002. The transmitter 1078 and receiver 1080 may be collectively referred to as a transceiver 1076. An antenna 1082 may be electrically coupled to the transceiver 1076. The wireless communication device 1002 may also include (not shown) multiple transmitters, multiple receivers, multiple transceivers and/or additional antennas.

The various components of the wireless communication device 1002 may be coupled together by one or more buses, which may include a power bus, a control signal bus, a status signal bus, a data bus, etc. For the sake of clarity, the various buses are illustrated in FIG. 10 as a bus system 1084.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "couple" and any variations thereof may indicate a direct or indirect connection between elements. For example, a first element coupled to a second element may be directly connected to the second element, or indirectly connected to the second element through another element. The Figures may denote couplings with lines and/or arrows.

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc, where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 2, 4, and 9, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A wireless communication device for thermal mitigation with multiple processors, comprising:
   a first communications processor that processes a data call in accordance with a first radio access technology; and
   a second communications processor coupled to the first communications processor,
   wherein the first communications processor performs a thermal mitigation operation by sending instructions and session information associated with the data call to the second communications processor when at least one thermal threshold is reached,
   wherein the second communications processor receives and executes the instructions,
   wherein the instructions comprise instructions to transfer the data call to the second communications processor and to process the data call in accordance with a second radio access technology, and
   wherein the session information enables the second communications processor to manage the data call.

2. The wireless communication device of claim 1, wherein the instructions further comprise instructions for only allowing emergency communications.

3. The wireless communication device of claim 1, wherein the instructions further comprise instructions for transferring packet data communication operation to the second communications processor.

4. The wireless communication device of claim 1, wherein the instructions direct the second communications processor to disable streaming data traffic.

5. The wireless communication device of claim 1, wherein the instructions are based on the at least one thermal threshold.

6. The wireless communication device of claim 1, wherein the thermal mitigation operation comprises at least one of a group consisting of reducing a processing clock speed, reducing a receive data rate, reducing a transmit data rate and disabling streaming data traffic.

7. The wireless communication device of claim 1, wherein the first communications processor provides data associated with the data call to the second communications processor when the at least one thermal threshold is reached.

8. The wireless communication device of claim 1, wherein the session information associated with the data call comprises one or more of an Internet Protocol (IP) address, server identification, authentication information, control information, and combinations thereof.

9. The wireless communication device of claim 1, further comprising at least one thermal sensor coupled to the first communications processor that obtains a thermal indication.

10. The wireless communication device of claim 1, wherein the first communications processor comprises a modem.

11. The wireless communication device of claim 1, wherein the first communications processor comprises at least one of a group consisting of a transmitter and a receiver.

12. The wireless communication device of claim 1, wherein the second communications processor comprises a modem.

13. The wireless communication device of claim 1, wherein the second communications processor comprises at least one of a group consisting of a transmitter and a receiver.

14. The wireless communication device of claim 1, wherein the first communications processor is capable of operating at a higher clock rate than the second communications processor.

15. The wireless communication device of claim 1, wherein the first radio access technology comprises at least one of Time Division Long-Term Evolution (TD-LTE), Time Division Synchronous Code Division Multiple Access (TD-SCDMA), Frequency-Division Duplexing Long-Term Evolution (FDD-LTE), Universal Mobile Telecommunication System (UMTS), Global System for Mobile Communications (GSM) Enhanced Data Rates for GSM Evolution (EDGE) Radio Access Network (GERAN) and Global Positioning System (GPS).

16. The wireless communication device of claim 1, wherein the second radio access technology comprises at least one of Global System for Mobile Communications (GSM), General Packet Radio Service (GPRS), Enhanced Data Rates for GSM Evolution (EDGE) and one or more of second-generation (2G), third-generation (3G) and fourth-generation (4G) wireless technology of 3rd Generation Partnership Project (3GPP) specifications or 3rd Generation Partnership Project 2 (3GPP2) specifications.

17. A method for thermal mitigation with multiple processors, comprising:
   processing a data call by a first communications processor in accordance with a first radio access technology;
   performing a thermal mitigation operation, by the first communications processor, by sending instructions and session information associated with the data call to a second communications processor when at least one thermal threshold is reached, wherein the instructions comprise instructions to transfer the data call to the second communications processor and to process the data call in accordance with a second radio access technology, and wherein the session information enables the second communications processor to manage the data call; and
   receiving and executing the instructions at the second communications processor.

18. The method of claim 17, wherein the instructions further comprise instructions for only allowing emergency communications.

19. The method of claim 17, wherein the instructions further comprise instructions for transferring packet data communication operation to the second communications processor.

20. The method of claim 17, wherein the instructions direct the second communications processor to disable streaming data traffic.

21. The method of claim 17, wherein the instructions are based on the at least one thermal threshold.

22. The method of claim 17, wherein the thermal mitigation operation comprises at least one of a group consisting of reducing a processing clock speed, reducing a receive data rate, reducing a transmit data rate and disabling streaming data traffic.

23. The method of claim 17, further comprising providing data associated with the data call to the second communications processor when the at least one thermal threshold is reached.

24. The method of claim 17, wherein the session information associated with the data call comprises one or more of an Internet Protocol (IP) address, server identification, authentication information, control information, and combinations thereof.

25. The method of claim 17, further comprising obtaining a thermal indication.

26. The method of claim 17, wherein the first communications processor comprises a modem.

27. The method of claim 17, wherein the first communications processor comprises at least one of a group consisting of a transmitter and a receiver.

28. The method of claim 17, wherein the second communications processor comprises a modem.

29. The method of claim 17, wherein the second communications processor comprises at least one of a group consisting of a transmitter and a receiver.

30. The method of claim 17, wherein the first communications processor is capable of operating at a higher clock rate than the second communications processor.

31. The method of claim 17, wherein the first radio access technology comprises at least one of Time Division Long-Term Evolution (TD-LTE), Time Division Synchronous Code Division Multiple Access (TD-SCDMA), Frequency-Division Duplexing Long-Term Evolution (FDD-LTE), Universal Mobile Telecommunication System (UMTS), Global System for Mobile Communications (GSM), Enhanced Data Rates for GSM Evolution (EDGE) Radio Access Network (GERAN) and Global Positioning System (GPS).

32. The method of claim 17, wherein the second radio access technology comprises at least one of Global System for Mobile Communications (GSM), General Packet Radio Service (GPRS), Enhanced Data Rates for GSM Evolution (EDGE) and one or more of second-generation (2G), third-generation (3G) and fourth-generation (4G) wireless technology of 3rd Generation Partnership Project (3GPP) specifications or 3rd Generation Partnership Project 2 (3GPP2) specifications.

33. A non-transitory tangible computer-readable medium having instructions thereon, the instructions comprising:
  code for causing a wireless communication device to process a data call in accordance with a first radio access technology,
  code for causing the wireless communication device to perform a thermal mitigation operation, by a first communications processor, by sending second instructions and session information associated with the data call to a second communications processor when at least one thermal threshold is reached, wherein the second instructions comprise instructions to transfer the data call to the second communications processor and to process the data call in accordance with a second radio access technology, and wherein the session information enables the second communications processor to manage the data call; and
  code for causing the wireless communication device to receive and execute the instructions at the second communications processor.

34. The non-transitory computer-readable medium of claim 33, wherein the second instructions further comprise instructions for only allowing emergency communications.

35. The non-transitory computer-readable medium of claim 33, wherein the second instructions further comprise instructions for transferring packet data communication operation to the second communications processor.

36. The non-transitory computer-readable medium of claim 33, wherein the second instructions direct the second communications processor to disable streaming data traffic.

37. The non-transitory computer-readable medium of claim 33, wherein the second instructions are based on the at least one thermal threshold.

38. The non-transitory computer-readable medium of claim 33, wherein the thermal mitigation operation comprises at least one of a group consisting of reducing processing clock speed, reducing a receive data rate, reducing a transmit data rate and disabling streaming data traffic.

39. The non-transitory computer-readable medium of claim 33, wherein the instructions further comprise code for causing the wireless communication device to provide data associated with the data call to the second communications processor when the at least one thermal threshold is reached.

40. The non-transitory computer-readable medium of claim 33, wherein the session information associated with the data call comprises one or more of an Internet Protocol (IP) address, server identification, authentication information, control information, and combinations thereof.

41. The non-transitory computer-readable medium of claim 33, wherein the instructions further comprise code for causing the wireless communication device to obtain a thermal indication.

42. An apparatus for thermal mitigation, comprising:
  a first processing means for processing a data call in accordance with a first radio access technology and for performing a thermal mitigation operation by sending instructions and session information associated with the data call when at least one thermal threshold is reached; and
  a second processing means for receiving and executing the instructions, wherein the instructions comprise instructions for transferring the data call to the second processing means and for processing the data call in accordance with a second radio access technology, wherein the session information enables the second processing means to manage the data call.

43. The apparatus of claim 42, wherein the instructions further comprise instructions for only allowing emergency communications.

44. The apparatus of claim 42, wherein the instructions further comprise instructions for transferring packet data communication operation to the second processing means.

45. The apparatus of claim 42, wherein the instructions further comprise instructions for disabling streaming data traffic.

46. The apparatus of claim 42, wherein the instructions are based on the at least one thermal threshold.

47. The apparatus of claim 42, wherein the thermal mitigation operation comprises at least one of a group consisting of reducing a processing clock speed, reducing a receive data rate, reducing a transmit data rate and disabling streaming data traffic.

48. The apparatus of claim 42, wherein the session information associated with the data call comprises one or more of an Internet Protocol (IP) address, server identification, authentication information, control information, and combinations thereof.

49. The apparatus of claim 42, further comprising means for providing data associated with the data call to the second processing means when the at least one thermal threshold is reached.

50. The apparatus of claim 42, further comprising means for obtaining a thermal indication.

* * * * *